United States Patent
Iwata et al.

(10) Patent No.: US 11,790,913 B2
(45) Date of Patent: Oct. 17, 2023

(54) INFORMATION PROVIDING METHOD, APPARATUS, AND STORAGE MEDIUM, THAT TRANSMIT RELATED INFORMATION TO A REMOTE TERMINAL BASED ON IDENTIFICATION INFORMATION RECEIVED FROM THE REMOTE TERMINAL

(71) Applicant: YAMAHA CORPORATION, Hamamatsu (JP)

(72) Inventors: Takahiro Iwata, Tokyo (JP); Yuki Seto, Tokyo (JP)

(73) Assignee: YAMAHA CORPORATION, Hamamatsu (JP)

( * ) Notice: Subject to any disclaimer, the term of this patent is extended or adjusted under 35 U.S.C. 154(b) by 0 days.

(21) Appl. No.: 17/695,258

(22) Filed: Mar. 15, 2022

(65) Prior Publication Data
US 2022/0208190 A1    Jun. 30, 2022

Related U.S. Application Data

(63) Continuation of application No. 16/782,160, filed on Feb. 5, 2020, now abandoned, which is a continuation
(Continued)

(30) Foreign Application Priority Data

Aug. 31, 2017  (JP) .................................. 2017-166984

(51) Int. Cl.
*G10L 15/00* (2013.01)
*G10L 15/22* (2006.01)
(Continued)

(52) U.S. Cl.
CPC ............ *G10L 15/22* (2013.01); *G10L 15/005* (2013.01); *G10L 15/183* (2013.01);
(Continued)

(58) Field of Classification Search
CPC .......... G10L 15/00; G10L 15/26; G06F 40/40
See application file for complete search history.

(56) References Cited

U.S. PATENT DOCUMENTS 9,405,823 B2  8/2016  Mamou
9,443,518 B1  9/2016  Gauci
(Continued)

FOREIGN PATENT DOCUMENTS

JP  H02190888 A  7/1990
JP  2002207657 A  7/2002
(Continued)

OTHER PUBLICATIONS

Office Action issued in European Appln. No. 18850263.7 dated May 4, 2022.
(Continued)

*Primary Examiner* — Jialong He
(74) *Attorney, Agent, or Firm* — ROSSI, KIMMS & McDOWELL LLP

(57) ABSTRACT

A computer-implemented information providing method includes: storing, at an information providing apparatus, a plurality of pieces of related information in association with a same identification information in a storage device, wherein each of the plurality of the pieces of the related information is representative of a content of a corresponding one of a series of a plurality of speech voices uttered to a first device; and in response to a request from a second device that receives the identification information, causing, at the information providing apparatus, a communication device to transmit to the second device one or more of the plurality of the pieces of the related information associated with the same identification information.

6 Claims, 6 Drawing Sheets

Related U.S. Application Data of application No. PCT/JP2018/030407, filed on Aug. 16, 2018.

(51) Int. Cl.
*G06F 40/40* (2020.01)
*G10L 15/183* (2013.01)
*H04M 1/72433* (2021.01)

(52) U.S. Cl.
CPC ... *H04M 1/72433* (2021.01); *G10L 2015/223* (2013.01); *H04M 2201/40* (2013.01)

(56) References Cited

U.S. PATENT DOCUMENTS

| | | |
|---|---|---|
| 2002/0161578 A1 | 10/2002 | Saindon |
| 2008/0201143 A1 | 8/2008 | Olligschlaeger |
| 2010/0268534 A1 | 10/2010 | Kishan Thambiratnam |
| 2012/0035907 A1 | 2/2012 | Lebeau |
| 2013/0144603 A1 | 6/2013 | Lord |
| 2014/0208236 A1 | 7/2014 | Gibbon |
| 2014/0365203 A1 | 12/2014 | Waibel |
| 2015/0154183 A1 | 6/2015 | Kristjansson |
| 2015/0235654 A1 | 8/2015 | Gibbon |
| 2015/0339390 A1 | 11/2015 | Urdiales Delgado |
| 2017/0206195 A1 | 7/2017 | Moriguchi |
| 2017/0212720 A1* | 7/2017 | Moriguchi .............. G06F 40/47 |

FOREIGN PATENT DOCUMENTS

| | | |
|---|---|---|
| JP | 2003302996 A | 10/2003 |
| JP | 2005228107 A | 8/2005 |
| JP | 2006267934 A | 10/2006 |
| JP | 2008011272 A | 1/2008 |
| JP | 2008225744 A | 9/2008 |
| JP | 2010130051 A | 6/2010 |
| JP | 2016184193 A | 10/2016 |
| JP | 2016192599 A | 11/2016 |
| WO | 2016017577 A1 | 2/2016 |

OTHER PUBLICATIONS

Office Action issued in Japanese Appln. No. 2019-202399 dated Aug. 23, 2022. English translation provided.
Office Action issued in Chinese Appln. No. 201880052918.7 dated Jan. 4, 2023. English translation provided.
International Search Report issued in Intl. Appln. No PCT/JP2018/030407 dated Oct. 2, 2018. English translation provided.
Written Opinion issued in Intl. Appln. No. PCT/JP2018/030407 dated Oct. 2, 2018.
Office Action issued in Japanese Appln. No. 2019-519031 dated Jun. 25, 2019. English translation provided.
Extended European Search Report issued in European Appln. No. 18850263.7 dated Feb. 25, 2021.
Office Action issued in U.S. Appl. No. 16/782,160 dated Oct. 7, 2021.
Office Action issued in U.S. Appl. No. 16/782,160 dated Jan. 10, 2022.
Office Action issued in Japanese Application No. 2019-202399 dated Feb. 8, 2022. English machine translation provided.
Office Action issued in Chinese Appln. No. 201880052918.7, dated Aug. 10, 2023. English machine translation provided.

* cited by examiner

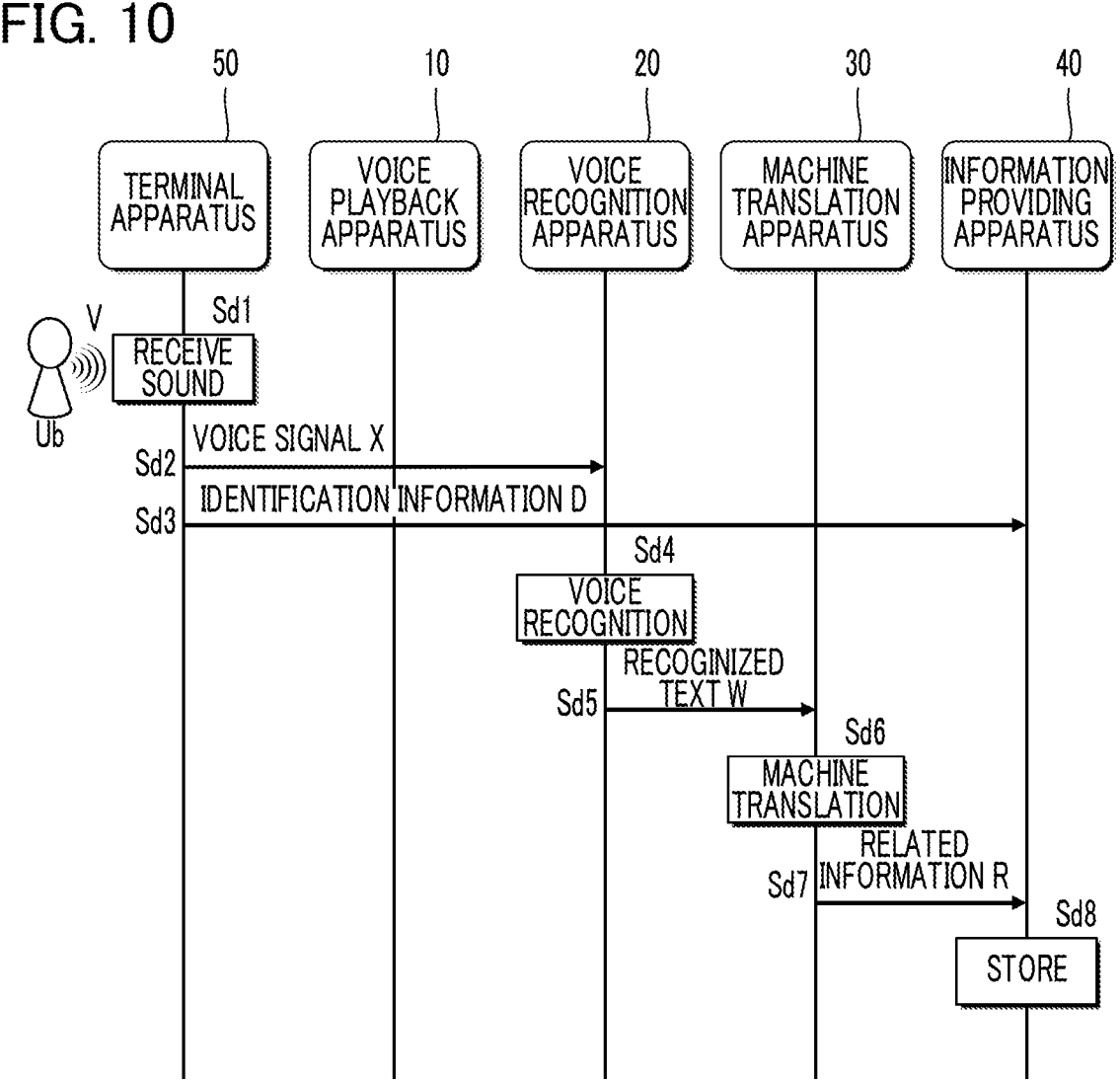

INFORMATION PROVIDING METHOD, APPARATUS, AND STORAGE MEDIUM, THAT TRANSMIT RELATED INFORMATION TO A REMOTE TERMINAL BASED ON IDENTIFICATION INFORMATION RECEIVED FROM THE REMOTE TERMINAL

CROSS REFERENCE TO RELATED APPLICATIONS

This application is a Continuation Application of PCT Application No. PCT/JP2018/030407, filed Aug. 16, 2018, and is based on and claims priority from Japanese Patent Application No. 2017-166984, filed Aug. 31, 2017, the entire contents of each of which are incorporated herein by reference.

BACKGROUND

Technical Field

The present disclosure relates to a technique for providing information to users.

Description of Related Art

To date, techniques have been proposed in the art for providing various types of information to users of terminal apparatuses. For example, Japanese Patent Application Laid-Open Publication No. H2-190888 discloses a guide system in which audio descriptions are stored in advance in a playback unit carried by a user. The guide system plays back an audio description that corresponds to code information transmitted from a transmission means in the vicinity of an exhibit.

The technique disclosed in Japanese Patent Application Laid-Open Publication No. H2-190888 simply makes provision for advance storage of audio descriptions in a playback unit for selective playback. User convenience would be significantly enhanced, however, if a user were to be provided with information representative of content of vocal information serially presented during a lecture, for example. Such provision of information would be of particular convenience to a user with hearing loss, since the user would be able to readily follow and understand vocal information presented during the lecture.

SUMMARY

It is thus an object of the present disclosure to provide a user with serial pieces of information corresponding to vocal information presented in sequence.

To achieve the above-stated object, a computer-implemented information providing method according to an aspect of the present disclosure includes storing, at an information providing apparatus, a plurality of pieces of related information in association with a same identification information in a storage device, where each of the plurality of the pieces of the related information is representative of a content of a corresponding one of a series of a plurality of speech voices uttered to a first device; and in response to a request from a second device that receives the identification information, causing, at the information providing apparatus, a communication device to transmit to the second device one or more of the plurality of the pieces of the related information associated with the same identification information.

A computer-implemented information providing method according to another aspect of the present disclosure includes: storing, at an information providing apparatus, a plurality of related information series in association with a same identification information in a storage device, where each of the plurality of related information series correspond to different languages, where each of the plurality of related information series includes a plurality of the pieces of the related information, where each of the plurality of pieces of the related information is representative of a content of a corresponding one of a series of a plurality of speech voices uttered to a first device, and where each of the plurality of the pieces of the related information is generated by voice recognition carried out on a corresponding one of the plurality of the speech voices and machine translation carried out on a recognized text identified by the voice recognition; and in response to a request from a second device that receives the identification information, causing, at the information providing apparatus, a communication device to transmit to the second device one or more of the plurality of the pieces of the related information associated with the same identification information and that correspond to a language configured in the second device from among the different languages.

An information providing apparatus according to still another aspect of the present disclosure has: at least one processor; and a memory that is operatively coupled to the at least one processor and that is configured to store instructions executable by the processor, where upon execution of the instructions the processor is caused to: store a plurality of pieces of related information in association with a same identification information in a storage device, where each of the plurality of the pieces of the related information is representative of a content of a corresponding one of a plurality of speech voices uttered in sequence to a first device; and in response to a request from a second device that receives the identification information, cause a communication device to transmit to the second device one or more of the plurality of the pieces of the related information associated with the same identification information.

BRIEF DESCRIPTION OF THE DRAWINGS

FIG. 9 is a schematic diagram of a reference table in the second embodiment.

FIG. 10 is an explanatory diagram of operation of the communication system and the terminal apparatus in the third embodiment.

DESCRIPTION OF THE EMBODIMENTS

First Embodiment

Figure 1:
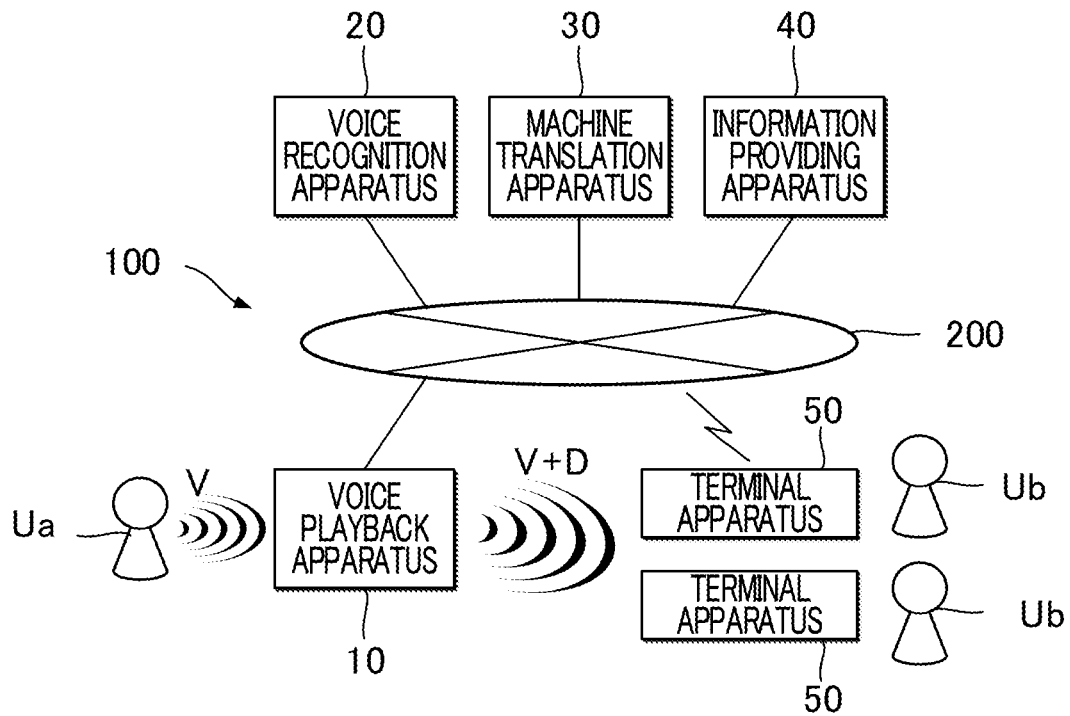
FIG. 1 is a block diagram illustrating a configuration of a communication system according to a first embodiment of the present disclosure.

FIG. 1 is a block diagram showing an example configuration of a communication system 100 according to a first embodiment of the present disclosure. The communication system 100 according to the first embodiment is a computer system for providing information to a user Ub who situated in a facility, such as a hall or a conference room (hereafter, "provider facility"). The communication system 100 has a voice playback apparatus 10, a voice recognition apparatus 20, a machine translation apparatus 30, and an information providing apparatus 40. Each element of the communication system 100 can communicate with each other via a communication network 200, such as a mobile communication network, the Internet, or similar.

The voice playback apparatus 10 (example of a first device) is installed in a provider facility. In the provider facility, there may be held, for example, a lecture in which a human speaker Ua utters vocal sounds serially. The voice playback apparatus 10 is a sound system that receives and outputs vocal sounds serially uttered by the speaker Ua (hereafter, "speech voice") V. The user Ub is an audience member at the lecture, and is situated in the provider facility with the terminal apparatus 50. The terminal apparatus 50 (an example of a second device) is a portable information terminal, such as a portable phone, or a smart phone, or the like. In some embodiments, the terminal apparatus 50 may be a guidance device, such as an electronic bulletin board, digital signage, or the like installed in the provider facility. For convenience, the following description focuses on a single terminal apparatus 50.

Figure 2:
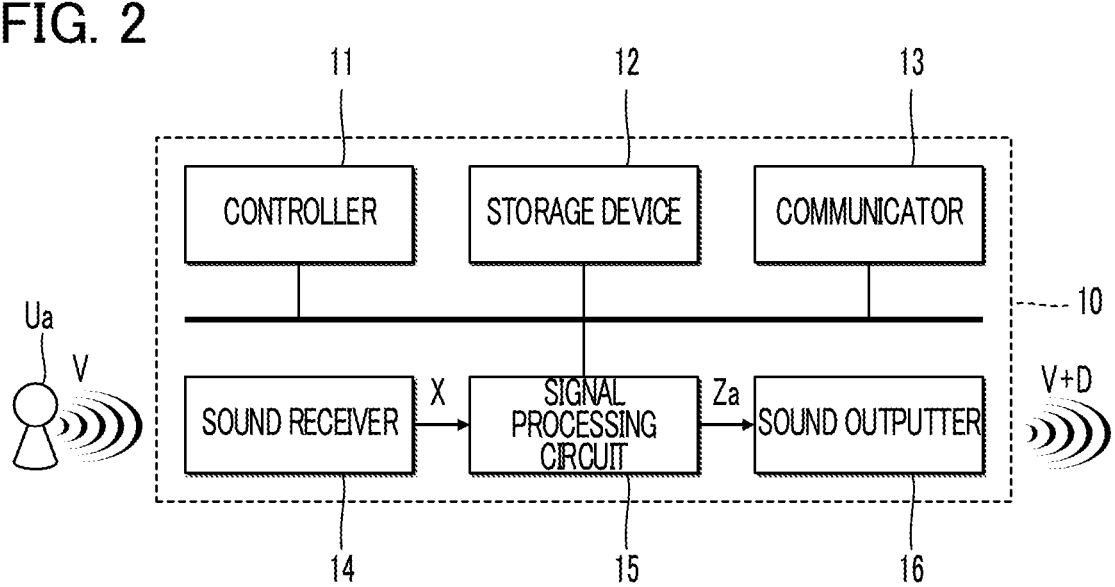
FIG. 2 is a block diagram illustrating a configuration of a voice playback apparatus.

FIG. 2 is a block diagram showing a configuration of the voice playback apparatus 10. As shown in FIG. 2, the voice playback apparatus 10 of the first embodiment has a controller 11, a storage device 12, a communicator 13, a sound receiver 14, a signal processing circuit 15, and a sound outputter 16. In some embodiments, a public-address system, which is installed in the provider facility, or an information terminal such as a tablet terminal or a personal computer may be used as the voice playback apparatus 10. The voice playback apparatus 10 may be realized by use of a single device or by use of multiple devices that are separate bodies (i.e., system).

The sound receiver 14 is an audio device (microphone) that receives sounds within a surrounding environment. The human speaker Ua utters a speech voice V to the sound receiver 14. The sound receiver 14 receives the sound of the speech voice V uttered by the speaker Ua, and generates a voice signal X representative of the speech voice V. For brevity, description is omitted of an A/D converter used for converting the voice signal X generated by the sound receiver 14 from analog to digital format.

The controller 11 consists of processing circuitry such as a CPU (Central Processing Unit), and carries out overall control of each element in the voice playback apparatus 10. The storage device 12 has stored therein computer programs executed by the controller 11 and various types of data used by the controller 11. For example, a publicly known recording medium, such as a semiconductor recording medium or a magnetic recording medium, or a combination of different types of recording media are each suitable for use as the storage device 12.

The controller 11 of the first embodiment generates identification information D by executing a computer program stored in the storage device 12. The identification information D is identification information of a series of speech voices V vocalized in the provider facility. For example, distinct identification information D can be assigned to different lectures. The identification information D may be generated in a freely-selected manner. For example, the controller 11 generates identification information D that includes a time at which operation of the voice playback apparatus 10 starts, or a random number having a predetermined number of digits. The time or random number may be combined with identification information that is uniquely assigned to the voice playback apparatus 10 for use as the identification information D. A lecture held in the provider facility consists of a series of speech voices V, and thus the identification information D can be understood as being identification of the lecture, or identification of the provider facility.

The communicator 13 communicates with another device via a communication network 200 under control of the controller 11. The communicator 13 of the first embodiment transmits to the voice recognition apparatus 20 a voice signal X derived from a sound received by the sound receiver 14 and transmits the identification information D generated by the controller 11 to the information providing apparatus 40.

Figure 3:
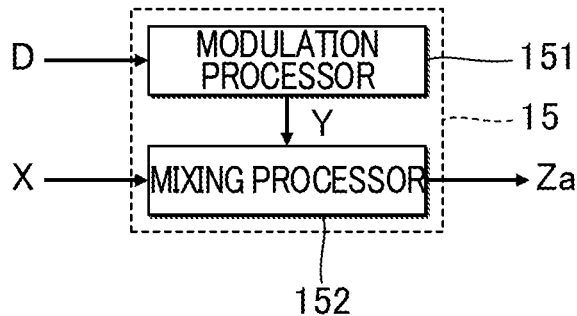
FIG. 3 is a block diagram illustrating a configuration of a signal processing circuit.

The signal processing circuit 15 generates an audio signal Za that is representative of a mixed sound of the speech voice V and the identification information D. As shown in FIG. 3, the signal processing circuit 15 of the first embodiment includes a modulation processor 151 and a mixing processor 152. At least a part of the functions of the signal processing circuit 15 may be realized by the controller 11.

The modulation processor 151 generates a modulation signal Y representative of the identification information D as sound components, where the identification information D is generated by the controller 11. Specifically, the modulation processor 151 generates a modulation signal Y by use of a modulation process such as amplitude modulation or frequency modulation to modulate a carrier wave of a predetermined frequency for example, with the identification information D or carries out spread modulation of the identification information D using a spread code. A frequency band of the sound components representative of the identification information D is, for example, a frequency band that can be played by the sound outputter 16 and is within a range above a frequency band of a sound audible to a user Ub in a normal environment (for example, 18 kHz or higher, and 20 kHz or lower).

The mixing processor 152 in FIG. 3 generates an audio signal Za by mixing (for example, by adding) the voice signal X generated by the sound receiver 14 and the modulation signal Y generated by the modulation processor 151. As will be apparent from the foregoing description, the audio signal Za is representative of a mixed sound of the speech voice V uttered by the speaker Ua and a sound representative of the identification information D. Again, for brevity, description is omitted of a D/A converter used for converting the audio signal Za from digital to analog format.

The sound outputter 16 (for example, speaker device) of FIG. 2 plays a sound represented by the audio signal Za generated by the signal processing circuit 15. As will be apparent from the foregoing description, the sound outputter 16 of the first embodiment serves as an audio device for playing the speech voice V uttered by the speaker Ua; and also serves as a transmission device for transmitting the identification information D into the surrounding environment, by sound communication in which a sound wave, i.e., vibration of the air, acts as a transmission medium. That is, in the first embodiment, the identification information D is transmitted into the surrounding environment by sound communication in which a sound representative of the identification information D is output from the sound outputter 16 used to output the speech voice V. Consequently, an advantage is obtained in that there is no need to dedicate a device for transmission of the identification information D. Another advantage is obtained in that a range of transmission of the identification information D can be readily limited by use of sound insulation. Still another advantage is obtained in that information can be readily conveyed in a one-to-many relationship such as in a lecture.

The voice playback apparatus 10 may transmit the identification information D at freely-selected timings. For example, the voice playback apparatus 10 may transmit the identification information D each time the speaker Ua utters the speech voice V. Alternatively, the voice playback apparatus 10 may transmit the identification information D at a predetermined cycle regardless of whether or not the speaker Ua utters a voice. A preferable configuration is one in which the identification information D is transmitted from the voice playback apparatus 10 at different time points on a time axis so that the identification information D is provided to a terminal apparatus 50 of a user Ub who arrives at the provider facility after a lecture has started.

The voice recognition apparatus 20 of FIG. 1 receives from the communication network 200 the voice signal X transmitted from the voice playback apparatus 10. The voice recognition apparatus 20 of the first embodiment is a computer system (for example, a web server) configured to execute voice recognition on the voice signal X, to identify a text W representative of a content of the speech voice V (hereafter, "recognized text W"). The voice recognition technique employed by the voice recognition apparatus 20 may be publicly known, for example, a recognition processing technique that uses an audio model, such as the Hidden Markov Model (HMM), a linguistic model indicative of linguistic restrictions, or the like.

The machine translation apparatus 30 generates multiple pieces of the related information R representative of the content of the speech voice V in different languages (e.g., Japanese, English, and Chinese), using machine translation of the recognized text W identified by the voice recognition apparatus 20. A publicly known technique may be freely employed for the machine translation by the machine translation apparatus 30. Examples of machine translation techniques used for generation of the related information R include rule-based machine translation and statistical machine translation. In rule-based machine translation, word order conversion and word conversion are carried out by referring to the linguistic rules and a syntax analysis result of the recognized text W. Statistical machine translation is carried out by using a statistical model representative of statistical tendencies in languages. As described above, the related information R of the first embodiment is generated by voice recognition and machine translation of the speech voice V.

Figure 4:
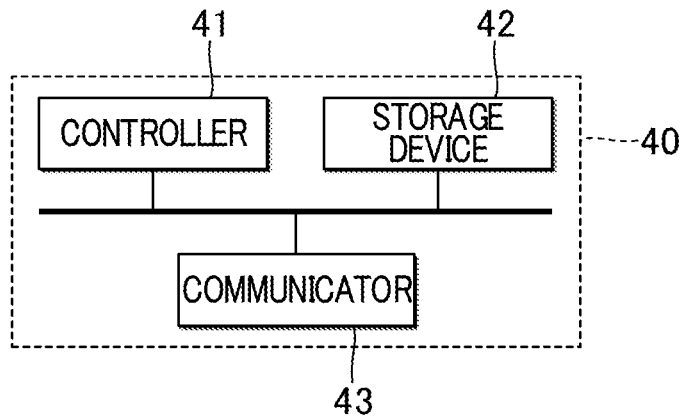
FIG. 4 is a block diagram illustrating a configuration of an information providing apparatus.

The information providing apparatus 40 is a computer system (for example, a web server) configured to provide the related information R generated by voice recognition and machine translation to the terminal apparatus 50 situated inside the provider facility. FIG. 4 is a block diagram showing a configuration of the information providing apparatus 40. As shown in FIG. 4, the information providing apparatus 40 of the first embodiment has a controller 41, a storage device 42, and a communicator 43. The information providing apparatus 40 may be realized by use of a single apparatus, or may be realized by use of multiple apparatuses that are separate bodies (i.e., system).

The controller 41 consists of processing circuitry such as a CPU, and carries out overall control of each element in the information providing apparatus 40. The storage device 42 has stored therein computer programs for execution by the controller 41, and various types of data used by the controller 41. For example, a publicly known recording medium, such as a semiconductor recording medium or a magnetic recording medium, or a combination of different types of recording media are each suitable for use as the storage device 42. The storage device 42 may be provided separately from the information providing apparatus 40 in a configuration in which the controller 41 executes writing and reading processing into and from the storage device 42 via the communication network 200. Accordingly, the storage device 42 may be omitted from the information providing apparatus 40.

Figure 5:
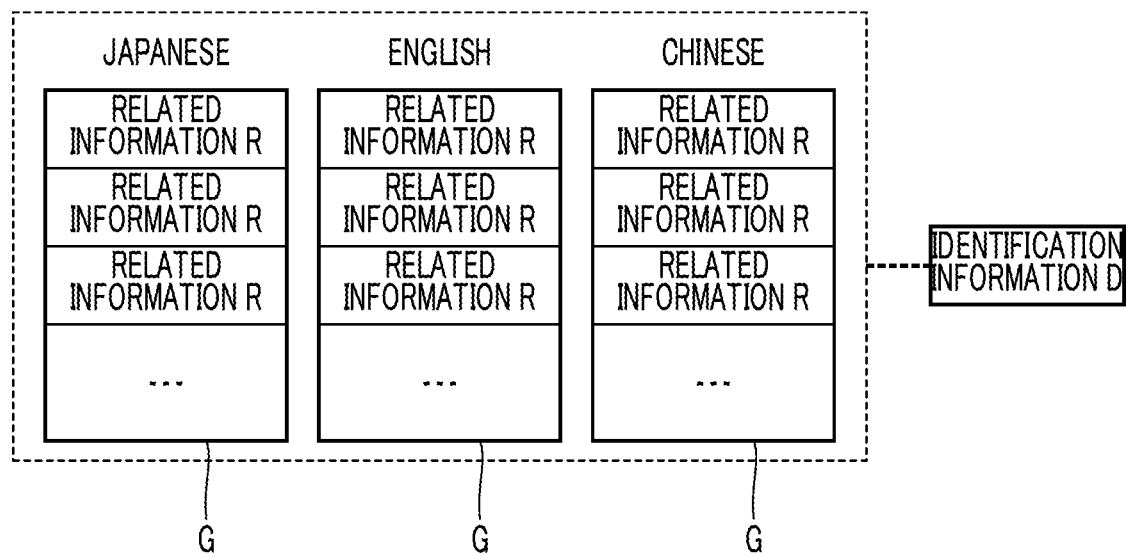
FIG. 5 is an explanatory diagram of related information stored in a storage device of the information providing apparatus.

The controller 41 (an example of a controller) according to the first embodiment stores in the storage device 42 pieces of the related information R in association with the same identification information D generated by the controller 11 of the voice playback apparatus 10, where each piece of the related information R is representative of a content of each of a series of speech voices V uttered by the speaker Ua into the voice playback apparatus 10. Specifically, as shown in FIG. 5, multiple series of pieces of information G corresponding to different languages are associated with the same identification information D. Serial pieces of the information G corresponding to a language consists of pieces of the related information R obtained by machine-translation of the recognized texts W of the respective speech voices V into the language. Thus, the serial pieces of the related information R generated from the speech voices V uttered in sequence by the speaker Ua are stored in the storage device 42 for each different language. For brevity, in FIG. 1 only one voice playback apparatus 10 is shown, although in reality the communication system 100 includes multiple voice playback apparatuses 10. In the storage device 42, there is stored for each of pieces of identification information D for different providing facilities, pieces of related information R corresponding to the speech voices V uttered inside a corresponding provider facility.

The communicator 43 of FIG. 4 communicates with another apparatus (the voice playback apparatus 10, the machine translation apparatus 30, or the terminal apparatus 50) via the communication network 200 under control of the controller 41. The communicator 43 of the first embodiment receives a request from a terminal apparatus 50 situated in a provider facility, and in response to the request, the communicator 43 transmits one or more pieces of the related information R associated with the identification information D of the provider facility to the requesting terminal apparatus 50.

Figure 6:
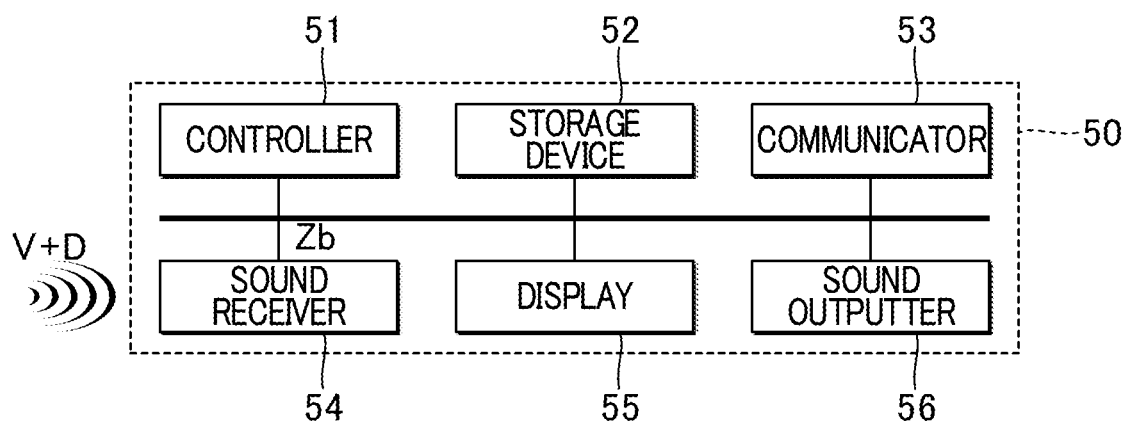
FIG. 6 is a block diagram illustrating a configuration of a terminal apparatus.

FIG. 6 is a block diagram showing a configuration of the terminal apparatus 50. As shown in FIG. 6, the terminal apparatus 50 of the first embodiment has a controller 51, a storage device 52, a communicator 53, a sound receiver 54, a display 55, and a sound outputter 56.

The sound receiver 54 is an audio device that receives sounds within a surrounding environment. Specifically, the sound receiver 54 receives a sound played by the sound outputter 16 of the voice playback apparatus 10, and generates an audio signal Zb representative of a waveform of the sound. The audio signal Zb contains sound components representative of the identification information D. For brevity, description is omitted of an A/D converter for converting the audio signal Zb generated by the sound receiver 54 from analog to digital format. The display 55 is provided with, for example, a liquid crystal display (LCD) panel, and displays various images under control of the controller 51.

The controller 51 consists of processing circuitry such as a CPU, and carries out overall control of each element in the terminal apparatus 50. The storage device 52 has stored therein computer programs for execution by the controller 51 and various types of data for use by the controller 51. For example, a publicly known recording medium, such as a semiconductor recording medium or a magnetic recording medium, or a combination of different types of recording media can be freely selected for use as the storage device 52.

The controller 51 of the first embodiment extracts the identification information D from the audio signal Zb generated by the sound receiver 54. Specifically, the controller 51 extracts the identification information D from the audio signal Zb, by carrying out a filtering process to emphasize a frequency band that includes the sound components representative of the identification information D in the audio signal Zb, and a demodulation process corresponding to the modulation process carried out on the identification information D. As will be apparent from the foregoing description, the sound receiver 54 of the first embodiment is used for voice calls between the terminal apparatus 50 and another terminal apparatus 50 or for voice recording when recording videos. The sound receiver 54 also serves as a reception device that receives the identification information D, by sound communication in which a sound wave, i.e., vibration of the air, acts as a transmission medium.

The communicator 53 communicates with the information providing apparatus 40 via the communication network 200 under control of the controller 51. For example, the communicator 53 transmits a request for the related information R (hereafter, "information request") to the information providing apparatus 40. The information request specifies the identification information D of a provider facility in which the terminal apparatus 50 is located and a language L configured in the terminal apparatus 50 (hereafter, "configured language L"). The configured language L is a language specified by the user Ub of the terminal apparatus 50. The communicator 53 causes the related information R transmitted from the information providing apparatus 40 responsive to the information request, to be displayed on the display 55.

Figure 7:
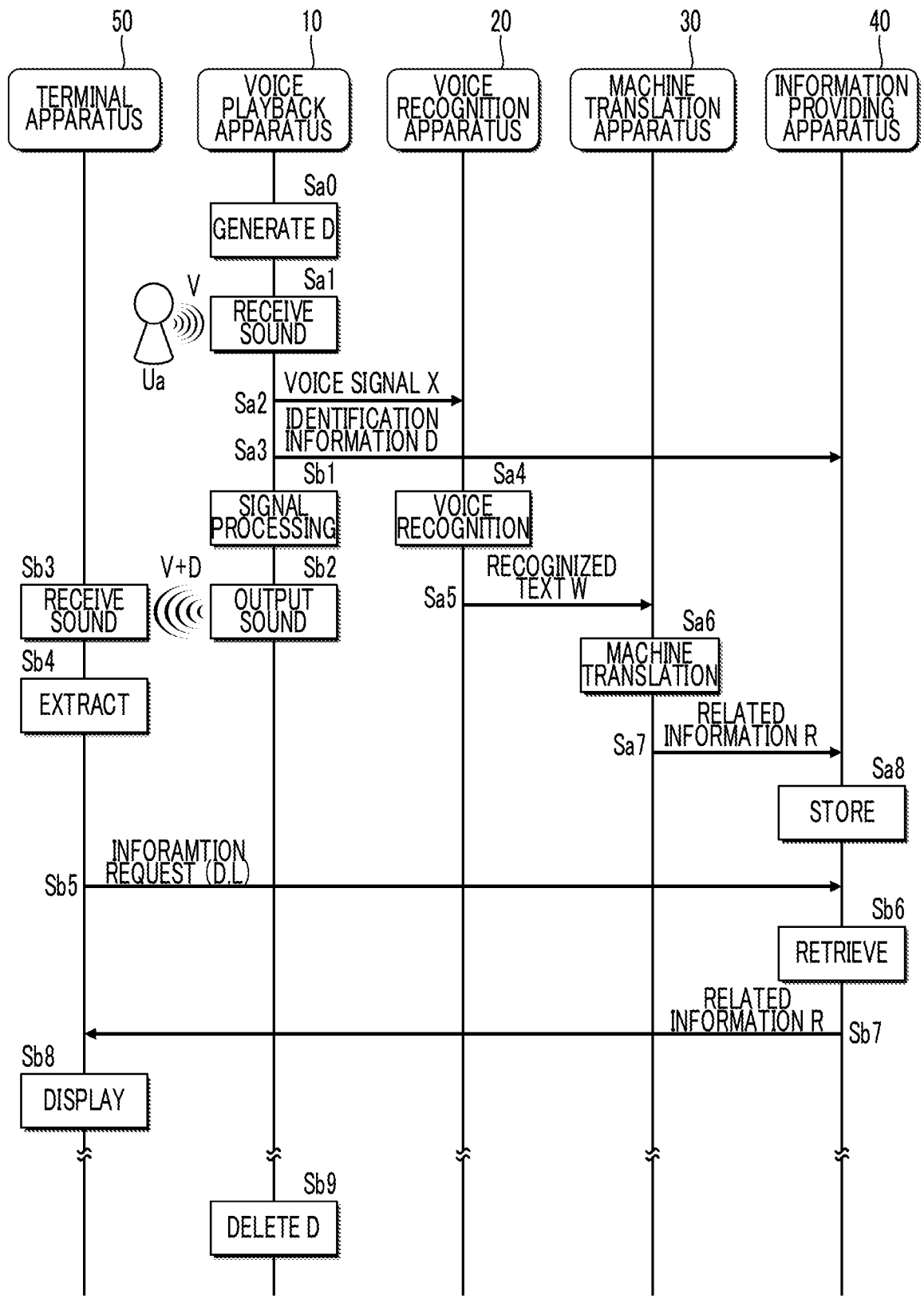
FIG. 7 is an explanatory diagram of operation of the communication system and the terminal apparatus.

FIG. 7 is an explanatory diagram showing an operation performed by the communication system 100 and a freely-selected terminal apparatus 50 according to the first embodiment. As shown in FIG. 7, the controller 11 of the voice playback apparatus 10 responsive to an instruction from the speaker Ua generates and stores the identification information D in the storage device 12 (Sa0). For example, the process of Step Sa0 is performed immediately after start of the lecture. The speaker Ua utters a speech voice V after generation of the identification information D.

As shown in FIG. 7, the sound receiver 14 of the voice playback apparatus 10 receives the speech voice V uttered by the speaker Ua and generates a voice signal X (Sa1).

The communicator 13 of the voice playback apparatus 10 transmits, responsive to an instruction from the controller 11, the voice signal X to the voice recognition apparatus 20 (Sa2). The communicator 13 also transmits the identification information D to the information providing apparatus 40 (Sa3). The transmission of the voice signal X (Sa2) and the transmission of the identification information D (Sa3) may be carried out in a freely selected order or the transmission of the voice signal X and the identification information D may be carried out in parallel.

The voice recognition apparatus 20 receives the voice signal X from the voice playback apparatus 10 and generates a recognized text W by performing voice recognition on the voice signal X (Sa4). The recognized text W is transmitted from the voice recognition apparatus 20 to the machine translation apparatus 30 (Sa5). The machine translation apparatus 30 receives the recognized text W from the voice recognition apparatus 20 and performs machine translation on the received recognized text W, and generates pieces of the related information R in different languages (Sa6). The pieces of the related information R corresponding to one speech voice V are transmitted from the machine translation apparatus 30 to the information providing apparatus 40 (Sa7). The information providing apparatus 40 stores the identification information D received from the voice playback apparatus 10 in association with the pieces of the related information R received from the machine translation apparatus 30 in the storage device 42 (Sa8). The above processing (Sa1 to Sa8) is repeated each time a speech voice V is uttered by the speaker Ua. As a result, serial pieces of the related information R (information series G) are stored in the storage device 42 for each language in association with the same identification information D indicative of the provider facility. The pieces of the related information R in each information series G are representative of content of the speech voices V. The boundary of each speech voice V is, for example, a soundless period in which the volume is below a threshold. The speech voice V may be a segment, such as a word, a sentence, or the like.

In the foregoing description, there is set out an example operation in which the voice playback apparatus 10 and the voice recognition apparatus 20 communicate with each other, and the voice recognition apparatus 20 and the machine translation apparatus 30 communicate with each other. Alternatively, the information providing apparatus 40 may relay information transmission/reception between each element. For example, the voice signal X transmitted from the voice playback apparatus 10 to the voice recognition apparatus 20 may be indirectly transmitted via the information-providing apparatus 40 to the voice recognition apparatus 20. The recognized text W generated by the voice recognition apparatus 20 for transmission to the machine translation apparatus 30 is transmitted via the information providing apparatus 40 indirectly to the machine translation apparatus 30.

After transmitting the voice signal X and the identification information D, the signal processing circuit 15 of the voice playback apparatus 10 generates an audio signal Za representative of a mixed sound of the speech voice V and sound components of the identification information D (Sb1). The audio signal Za is then supplied to the sound outputter 16, whereby the speech voice V is played and the identification information D is transmitted to the surrounding environment by sound communication (Sb2). The transmission of the voice signal X and the identification information D (Sa2 and Sa3), and the generation and output of a sound derived from the audio signal Za (Sb1 and Sb2) may be carried out in a freely selected order. For example, after the generation and output of a sound derived from the audio signal Za (Sb1 and Sb2), the communicator 13 may transmit the voice signal X and the identification information D.

The sound receiver 54 of the terminal apparatus 50 receives a playback sound output by the sound outputter 16 of the voice playback apparatus 10, and generates an audio signal Zb derived from the received playback sound (Sb3). The controller 51 of the terminal apparatus 50 extracts the identification information D from the audio signal Zb (Sb4). The communicator 53 of the terminal apparatus 50 transmits to the information providing apparatus 40 (Sb5) an information request including the identification information D extracted from the audio signal Zb and the configured language L of the terminal apparatus 50. For example, the information request may be repeatedly transmitted from the terminal apparatus 50 in predetermined cycles.

Upon receiving the information request transmitted from the terminal apparatus 50, the controller 41 of the information providing apparatus 40 retrieves from the storage device 42 latest related information R in the information series G corresponding to the configured language L specified in the information request from among the information series G corresponding to the identification information D specified in the information request (Sb6). The related information R that corresponds to the combination of the identification information D and the configured language L is retrieved from the storage device 42. The controller 41 causes the communicator 43 to transmit to the requesting terminal apparatus 50 (Sb7) the related information R retrieved from the storage device 42. As will be apparent from the foregoing description, the controller 41 serves as an element that causes the communicator 43 to transmit the related information R (an example of a transmitter).

In the above example, the latest single piece of the related information R is transmitted to the terminal apparatus 50, from among pieces of the related information R of information series G corresponding to the combination of the identification information D and the configured language L. However, the related information R transmitted to the terminal apparatus 50 is not limited thereto. In some embodiments, there may be transmitted to the terminal apparatus 50 all the existing pieces of the related information R included in the information series G corresponding to the combination of the identification information D and the configured language L. In some embodiments, the predetermined number of pieces of the related information R in the information series G may be transmitted to the terminal apparatus 50. In some embodiments, pieces of the related information R that have not yet been transmitted may be selected from among the pieces of the related information R of the information series G, and the selected pieces may be transmitted to the terminal apparatus 50. As will be apparent from the foregoing description, the information providing apparatus 40 transmits, in response to an information request from a terminal apparatus 50 that has received the identification information D from the voice playback apparatus 10, one or more pieces of the related information R corresponding to the identification information D, to the terminal apparatus 50.

As stated in the foregoing description, the information providing apparatus 40 transmits the related information R to the terminal apparatus 50 each time the apparatus 40 receives a periodically transmitted information request from the terminal apparatus 50. However, the transmission timing of the related information R to the terminal apparatus 50 is not limited to the above example. For example, upon receiving an information request from the terminal apparatus 50, the terminal apparatus 50 may be registered in the information providing apparatus 40 as a destination for the related information R. The information providing apparatus 40 transmits (push-transmits) the related information R to the terminal apparatus 50 registered as the destination for the related information R each time a speech voice V is uttered by the speaker Ua. In this way, the terminal apparatus 50 need not transmit the information request multiple times.

Upon receiving the related information R transmitted from the information providing apparatus 40, the controller 51 of the terminal apparatus 50 causes the related information R to be displayed on the display 55 (Sb8). As a result of repetition of the foregoing operation, there are serially displayed on the display 55 of the terminal apparatus 50, pieces of the related information R rendered in the configured language L, where the pieces of the related information R are representative of content of speech voices V uttered in sequence by the speaker Ua.

When the lecture ends, the speaker Ua instructs the information providing apparatus 40 to stop processing. In Step Sb9, the controller 11 of the information providing apparatus 40 deletes from the storage device 12 the identification information D used during the lecture in continuum from the start (Sa0) of the lecture. At the end processing described above, serial pieces of the related information R (for example, the minutes of the lecture) stored in the storage device 42 are made final.

As will be apparent from the foregoing description, in the first embodiment, the pieces of the related information R representative of content of speech voices V uttered in sequence are stored in association with the same identification information D in the storage device 42. Accordingly, as described in the first embodiment, the serial pieces of the related information R (for example, a content of a lecture) corresponding to speech voices V uttered in sequence can be serially provided to the terminal apparatus 50. The serial pieces of the related information R may be used as minutes of the lecture.

Furthermore, since the related information R is generated by voice recognition and machine translation of the speech voice V, an advantage is obtained in that the related information R of the content of the speech voice V when rendered in another language can be provided to the terminal apparatus 50. In the first embodiment, in particular, the pieces of the related information R representative of a speech voice V in different languages are generated, and from among the pieces of the related information R a piece of the related information R corresponding to the configured language L in the terminal apparatus 50 is transmitted to the terminal apparatus 50. Accordingly, it is possible to provide to the terminal apparatus 50 the related information R representative of content of a speech voice V in a language (the configured language L) that is understandable to the user Ub of the terminal apparatus 50, for example.

Second Embodiment

Description will now be given of a second embodiment of the present disclosure. In each of the configurations described below as examples, for elements whose actions or functions are similar to those in the first embodiment, like reference signs are used as in the first embodiment, and detailed descriptions thereof are omitted as appropriate.

Figure 8:
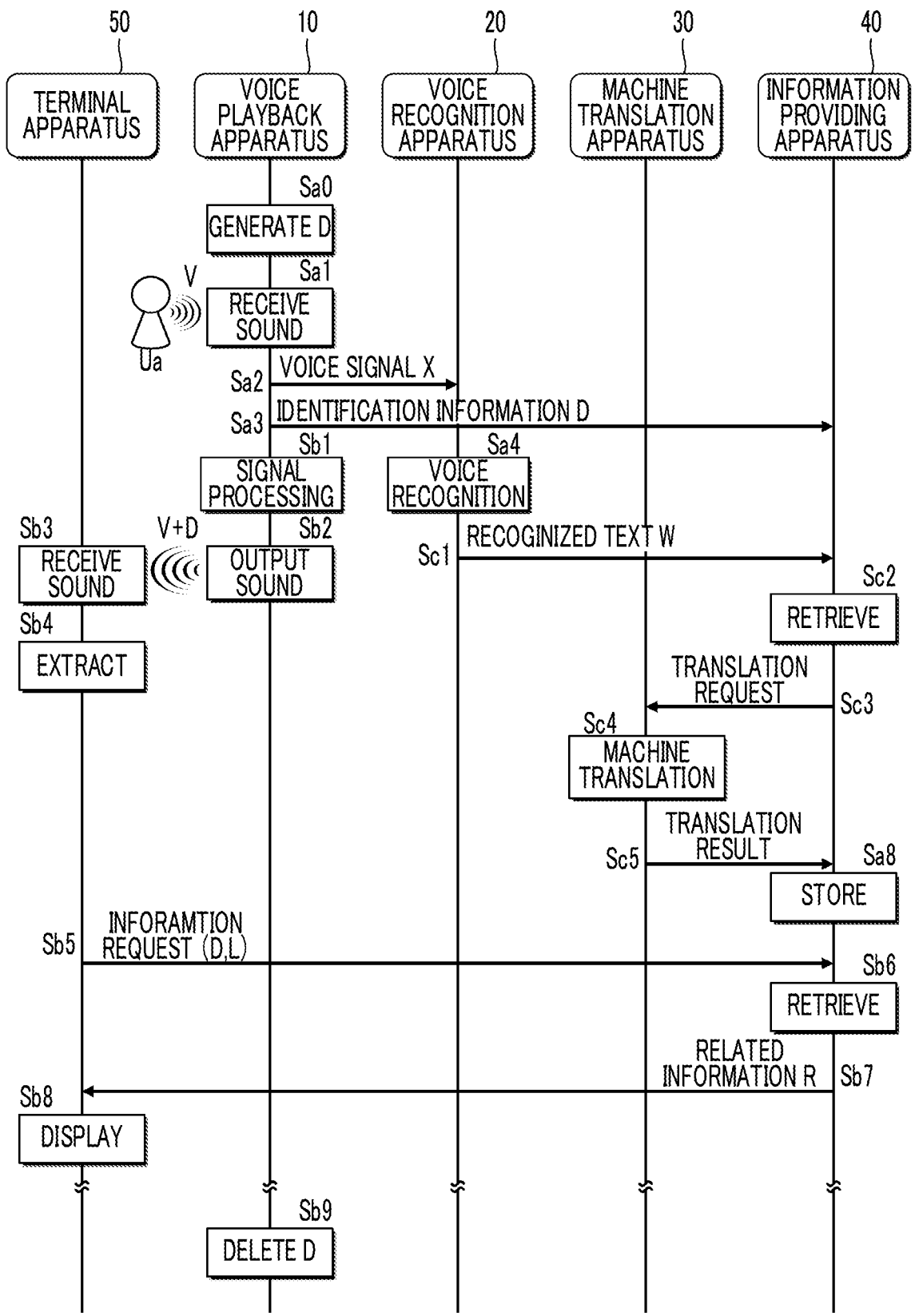
FIG. 8 is an explanatory diagram of operation of the communication system and the terminal apparatus in a second embodiment.

FIG. 8 is an explanatory diagram illustrating an operation performed by the communication system 100 and a freely-selected terminal apparatus 50 according to the second embodiment. As shown in FIG. 8, in the second embodiment, Steps Sa5 to Sa7 in the first embodiment are replaced by Steps Sc1 to Sc5. The recognized text W identified by the voice recognition apparatus 20 by performing voice recognition on the speech voice V is transmitted to the information providing apparatus 40 (Sc1).

As shown in FIG. 9, in the storage device 42 of the information providing apparatus 40 a reference table is stored. The reference table is a data table in which registered texts WR are registered for each of candidate texts WC, where the registered texts WR are renditions of a corresponding candidate text WC in different languages. The candidate texts WC are in the same language as that of the speech voice V. Each candidate text WC is a text that the speaker Ua is expected to utter as a speech voice V. In other words, the speaker Ua may freely select one of the candidate texts WC prepared in advance, to utter the selected candidate text WC as a speech voice V. For example, the speaker Ua may utter a speech voice V in accordance with a script in which a series of candidate texts WC is described as content to be spoken in a lecture. The speaker Ua may utter the candidate texts WC included in the reference table in the registered order.

The controller 41 of the information providing apparatus 40 identifies, from among the candidate texts WC registered in the reference table, a candidate text WC that is similar to the recognized text W, and thus identify registered texts WR that correspond to the candidate text WC (Sc2). That is, the registered texts WR are identified when rendered in different languages of the candidate text WC similar to the recognized text W. Specifically, the controller 41 calculates an index of similarity to the recognized text W for each of the candidate texts WC (hereafter, "similarity index"), to identify registered texts WR corresponding to a candidate text WC for which, from among the candidate texts WC, a similarity indicated by the similarity index is the highest (i.e., a candidate text WC that is the most similar to the recognized text W). Thus, registered texts WR that are renditions of the speech voice V in different languages are identified. The candidate texts WC may be used as the registered texts WR. A type of similarity index may be freely selected. However, a publicly known index, such as an edit distance for evaluating similarities between texts (Levenshtein distance), is suitable for use as a similarity index.

In some cases, a recognized text W may include a portion that is not the same as the candidate text WC (hereafter, "variable portion"). A common example of a variable portion is proper-name text or the like, which impedes prediction of an utterance to be made by the speaker Ua. A variable portion in each registered text WR in a different language is not translated. Accordingly, the controller 11 of the information providing apparatus 40 transmits a request for translation of a variable portion of the recognized text W (hereafter, "translation request") from the communicator 13 to the machine translation apparatus 30 (Sc3). The machine translation apparatus 30 carries out machine translation for the variable portion responsive to the translation request from the information providing apparatus 40 (Sc4). Specifically, the machine translation apparatus 30 generates texts that are renditions of variable portions in different languages. The translations of the variable portions are transmitted from the machine translation apparatus 30 to the information providing apparatus 40 (Sc5).

In the second embodiment, as the related information R there is used a combination of a registered text WR that is a rendition in a second language of the recognized text W, except for a variable portion, the recognized text W being in a first language, and a text that is a machine translation of the variable portion into the second language. Thus, similarly to the first embodiment, pieces of the related information R that are renditions of the content of the speech voice V in different languages are generated. The controller 11 of the information providing apparatus 40, as in the first embodiment, stores in the storage device 42 the identification information D received from the voice playback apparatus 10 and the pieces of related information R generated in the above-described procedures, in association with each other (Sa8). The above processing is repeated each time a speech voice V is uttered by the speaker Ua. As a result, serial pieces of related information R (information series G) are stored in the storage device 42 for each language in association with the same identification information D indicating the provider facility. The pieces of related information R in each information series G is representative of content of the speech voices V. The operation (Sb1 to Sb8) is the same as that of first embodiment, in which, in response to an information request from the terminal apparatus 50, the information providing apparatus 40 transmits the related information R to the terminal apparatus 50 such that the related information R is displayed on the display 55.

Essentially the same effects as those attained in the first embodiment can be attained also in the second embodiment. In the second embodiment, the related information R includes a registered text WR that is a rendition in another language of a candidate text WC that is similar to the recognized text W from among the candidate texts WC. In this way, an advantage is obtained in that even if a recognition error is included in a result of voice recognition on a speech voice V (i.e., the recognized text W), related information R representative of an appropriate text can be generated. Further, the related information R includes a text that is a rendition in another language of the variable portion, of the recognized text W, differing from the candidate text WC. Accordingly, a further advantage is obtained in that it is possible to generate related information R for a wide variety of content that is not bound to the pre-prepared candidate texts WC.

Third Embodiment

Description will now be given of a third embodiment of the present disclosure. In the third embodiment, a user Ub makes an utterance to the terminal apparatus 50 after listening to a speech voice V played by the sound outputter of the voice playback apparatus 10. As an example a case is assumed in which the user Ub presents opinions or questions responsive to the speech voice V of the speaker Ua.

FIG. 10 is an explanatory diagram showing an operation performed between the communication system 100 and a terminal apparatus 50 of the user Ub according to the third embodiment. For example, the operation shown in FIG. 10 is started in a condition that the terminal apparatus 50 receives the identification information D transmitted by the voice playback apparatus 10 by way of sound communication.

As shown in FIG. 10, the sound receiver 54 of the terminal apparatus 50 receives a sound of a speech voice V uttered by the user Ub, and generates a voice signal X from the received sound (Sd1). The communicator 53 of the terminal apparatus 50, in response to an instruction from the controller 51, transmits the voice signal X to the voice recognition apparatus 20 (Sd2). The communicator 53 also transmits the identification information D received from the voice playback apparatus 10 to the information providing apparatus 40 (Sd3). The transmission of the voice signal X (Sd2) and the transmission of the identification information D (Sd3) may be carried out in a freely selected order. Further, the voice signal X and the identification information D may be transmitted in parallel.

The voice recognition apparatus 20 receives the voice signal X from the terminal apparatus 50, and generates a recognized text W by carrying out voice recognition on the voice signal X (Sd4). The recognized text W is transmitted from the voice recognition apparatus 20 to the machine translation apparatus 30 (Sd5). The machine translation apparatus 30 receives the recognized text W from the voice recognition apparatus 20, and generates pieces of the related information R in different languages by carrying out machine translation on the recognized text W (Sd6). The pieces of the related information R that correspond to the speech voice V of the user Ub are transmitted from the machine translation apparatus 30 to the information providing apparatus 40 (Sd7). The information providing apparatus 40 stores the identification information D received from the terminal apparatus 50 of the user Ub in association with the pieces of the related information R received from the machine translation apparatus 30 in the storage device 42 (Sd8). Thus, serial pieces of the related information R representative of content of speech voices V (information series G) uttered by each of the speaker Ua and the user Ub are stored for each language in association with the same identification information D indicative of the provider facility in the storage device 42. The operation of transmitting the related information R from the information providing apparatus 40 to each terminal apparatus 50 is substantially the same as that in the first embodiment.

Essentially the same effects as those attained in the first embodiment can be attained also in the third embodiment. Further, in the third embodiment, the related information R representative of content of a speech voice V uttered by the user Ub by making an utterance to the terminal apparatus 50 is stored together with the related information R corresponding to a speech voice V of the speaker Ua, in association with the identification information D in the storage device 42. Accordingly, it is possible to transmit to each terminal apparatus 50 serial pieces of the related information R corresponding to speech voices V uttered in sequence by the speaker Ua and the user Ub.

Modifications of the Third Embodiment

In the third embodiment, the terminal apparatus 50 may be used as the voice playback apparatus 10. For example, a case is assumed in which users Ub converse with each other about freely-selected content (i.e., spontaneous talk) using their terminal apparatuses 50. In the conversation start phase, identification information D is transmitted by sound communication from a specific terminal apparatus 50 to surrounding terminal apparatuses 50. When the user Ub of each terminal apparatus 50 utters a speech voice V in a desired language (for example, the native language of the user Ub), pieces of the related information R representative of content of the speech voice V in different languages are generated by the voice recognition apparatus 20 and the machine translation apparatus 30 and stored in the storage device 42 of the information providing apparatus 40 in association with the same identification information D. The above processing is then repeated, and as a result serial pieces of the related information R representative of content of speech voices V of each user Ub (information series G) are stored for each language in association with the same identification information D in the storage device 42. Each terminal apparatus 50 receives from the information providing apparatus 40 the related information R corresponding to the configured language L of the terminal apparatus 50, from among the pieces of the related information R represented in different languages. The terminal apparatus 50 causes the received related information R to be displayed on the display 55. That is, speech voices uttered in sequence by multiple users Ub are displayed in the configured language L on the display 55.

However, it is not possible to distinguish respective users Ub by use of the identification information D only. Accordingly, the identification information of each terminal apparatus 50 (hereafter, "terminal identification information") may be used to distinguish each user Ub. The identification information is, for example, identification information unique to the terminal apparatus 50, or, for example, identification information assigned in advance by the information providing apparatus 40. It is of note that in the third embodiment also, the terminal identification information may be used to distinguish the speaker Ua and each user Ub. For example, a configuration is assumed in which to distinguish each of the multiple users Ub. Another configuration is also assumed by which to distinguish the speaker Ua (lecturer) and a collection of the multiple users Ub (audience).

Modifications

Specific modifications of each mode described above are described below. Two or more modes freely selected from the following exemplary ones may be appropriately combined in a manner that avoids any contradiction.

(1) In each of the above described embodiments, the related information R is displayed on the display 55 of the terminal apparatus 50. However, a method of presenting the related information R to the user Ub of the terminal apparatus 50 is not limited to the above example. For example, the sound outputter 56 of the terminal apparatus 50 may be configured to play a vocal sound indicative of the related information R, thereby presenting the related information R to the user Ub. For example, there can be assumed a configuration in which the related information R is in the form of a vocal sound, or a configuration of generating a vocal sound by performing voice synthesis on a text represented by the related information R. Furthermore, various types of images such as lecture handouts or images captured in the lecture (hereafter, "handout images") may be provided from the information providing apparatus 40 to each terminal apparatus 50, such that the handout images are able to be displayed together with the related information R on the display 55. It is of note that data that can be prepared in advance, such as handout images, may be stored in the terminal apparatus 50 in advance.

(2) The voice playback apparatus 10 may carry out at least one of voice recognition of a speech voice V or machine translation of a recognized text W. Alternatively, the information providing apparatus 40 may perform at least one of voice recognition of a speech voice V or machine translation of a recognized text W. The voice recognition and the machine translation may be carried out by a single apparatus. Two or more devices constituting the communication system 100 may be formed in a single body. Alternatively, the functions of each of the apparatuses that constitute the communication system 100 may be divided out among multiple apparatuses.

(3) Machine translation by the machine translation apparatus 30 may be omitted. For example, the recognized text W generated by voice recognition by the voice recognition apparatus 20 may be stored as the related information R in the storage device 42 of the information providing apparatus 40. In this configuration, the related information R representative of a speech voice V in the form of a text in the same language is provided to the terminal apparatus 50. As a result, by viewing the related information R displayed on the display 55 of the terminal apparatus 50, a hearing impaired person who has difficulty in hearing a speech voice V is able to understand the content of the speech voice V.

(4) Each of the above described embodiments shows a case in which the communication system 100 is used for a lecture. However, a situation in which the communication system 100 is used is not limited to the above example. For example, the communication system 100 is used in various situations such as in different types of conferences (e.g., international meetings, and the like), sports competitions, different types of lectures, and the like. The communication system 100 may be used to provide the related information R on content uttered by a performer (speaker Ua) to the terminal apparatus 50, in performances in which a script is uttered in sequence (for example, plays, musicals or kabuki shows), or in sung performances of music (for example, concerts or live shows).

(5) In each of the above described embodiments, the voice playback apparatus 10 transmits identification information D to the terminal apparatus 50 by communication of sound propagating as waves that acts as a transmission medium. However, a communication system for transmitting the identification information D from the voice playback apparatus 10 is not limited to sound communication. For example, the identification information D may be transmitted from the voice playback apparatus 10 to the terminal apparatus 50 by way of wireless communication using electric waves or electromagnetic waves such as infra-red waves as a transmission medium. For example, the sound outputter 56 in each of the above embodiments is replaced with a communication device for wireless communication. Specifically, wireless communication, such as Bluetooth (registered trademark) or WiFi (registered trademark), is suitable for transmission of the identification information D. As will be understood from the foregoing examples, near-field wireless communication not involving a communication network such as a mobile communication network is suitable for the transmission of the identification information D by the voice playback apparatus 10. Examples of such near-field wireless communication include sound communication with sound waves propagating through air that acts as a transmission medium and wireless communication using electromagnetic waves as a transmission medium. In some embodiments, a transmitter apparatus separate from the voice playback apparatus 10 may transmit the identification information D to the terminal apparatus 50 by use of near-field wireless communication. Thus, the identification information D is not limited to information transmitted from the voice playback apparatus 10.

(6) The information providing apparatus 40 according to each of the above described embodiments is realized by coordination between the controller 41 and a computer program. A computer program according to each of the above described embodiments is provided in a form that is stored in a computer-readable recording medium and is installed in a computer. The recording medium is, for example, a non-transitory recording medium, and is preferably an optical recording medium (optical disc) such as a CD-ROM. However, the recording medium may be provided in any known media format such as a semiconductor recording medium or a magnetic recording medium. It is of note that the non-transitory recording medium includes a freely-selected recording medium other than a transitory propagation signal, and a volatile recording medium may also be used. Furthermore, a computer program may be distributed to the computer via a communication network.

(7) The following configurations are derivable from the above described modes, for example.

An information providing method according to a preferred aspect (a first aspect) of the present disclosure includes storing, at an information providing apparatus, a plurality of pieces of related information in association with a same identification information in a storage device, where each of the plurality of the pieces of the related information is representative of a content of a corresponding one of a series of a plurality of speech voices uttered to a first device; and in response to a request from a second device that receives the identification information, causing, at the information providing apparatus, a communication device to transmit to the second device one or more of the plurality of the pieces of the related information associated with the same identification information. In the above aspect, the each of the plurality of the pieces of the related information representative of content of the each of the pieces of speech voices uttered in sequence is stored in association with the same identification information in the storage device. Accordingly, it is possible to provide a second device with serial pieces of related information corresponding to the uttered speech voices.

In a preferred example (a second aspect) of the first aspect, the method further includes transmitting the identification information to the second device by sound communication by which a sound outputter outputs a sound representative of the identification information, where the identification information is transmitted in conjunction with the utterance of each of the plurality of speech voices. In the above aspect, since the identification information is transmitted to the second device by sound communication using a sound outputter that outputs a speech voice, an advantage is obtained in that there is no need to dedicate a device for the transmission of the identification information. Another advantage is obtained in that a range of transmission of the identification information can be readily limited by use of sound insulation. It is of note that identification information may be transmitted by sound communication using a sound outputter separate from a sound outputter that outputs a speech voice.

In a preferred example (a third aspect) of the first aspect or the second aspect, the method further includes storing a piece of related information in association with the identification information in the storage device, where the piece of related information is representative of a content of a speech voice uttered to the second device. In the above aspect, related information of a speech voice uttered to the first device and related information of a speech voice uttered to the second device are stored in association with the same identification information in the storage device. Therefore, it is possible to provide serial pieces of related information corresponding to speech voices uttered in sequence by multiple speakers.

In a preferred example (a fourth aspect) of any one of the first to the third aspects, the related information is generated by voice recognition carried out on the speech voice and machine translation carried out on a recognized text identified by the voice recognition. In the above aspect, related information is generated by carrying out voice recognition and machine translation on a speech voice. Accordingly, it is possible to provide related information representative of a speech voice in another language to the second device, for example.

In a preferred example (a fifth aspect) of any one of the first to the fourth aspects, the storing the plurality of pieces of related information includes storing in the storage device a plurality of pieces of related information corresponding to different languages, each of the pieces of the related information being generated by voice recognition carried out on the speech voice and machine translation carried out on a recognized text identified by the voice recognition, and the causing the communication device to transmit the related information includes causing the communication device to transmit to the second device, responsive to a request from the second device, a piece of related information that corresponds to a language configured in the second device from among the plurality of the related information corresponding to the different languages. In the above aspect, pieces of related information corresponding to different languages are generated by carrying out voice recognition and machine translation on a speech voice, and a piece of related information that corresponds to a configured language of the second device is transmitted to the second language from among the pieces of the related information. Therefore, it is possible to provide the second device with the related information representative of content of a speech voice in a language that the user of the second device can understand, for example.

In a preferred example (a sixth aspect) of any one of the first to the fifth aspects, the related information includes a text in a second language, which is a rendition of, from among a plurality of candidate texts, a candidate text that is similar to a recognized text in a first language identified by voice recognition carried out on each of the plurality of the speech voices, where the related information further includes a text in the second language of a variable portion that differs from the candidate text in the recognized text. In the above aspect, from among the multiple candidate texts, a text that is a rendition in another language of a candidate text similar to a recognized text identified by voice recognition to a speech voice is included in the related information. Therefore, an advantage is obtained in that it is possible to generate related information representative of an appropriate text even if a recognition error is included in a result of voice recognition on a speech voice. Further, since the related information includes a text that is a rendition in another language of the variable portion, of the recognized text, differing from the candidate text, a further advantage is obtained in that it is possible to generate related information R for a wide variety of content that is not bound to the candidate texts.

An information providing apparatus according to a preferred aspect (a seventh aspect) of the present disclosure has a controller configured to store a plurality of pieces of related information in association with a same identification information in a storage device, where each of the plurality of the pieces of the related information is representative of a content of a corresponding one of a plurality of speech voices uttered in sequence to a first device; and a transmitter configured to, in response to a request from a second device that receives the identification information, cause a communication device to transmit to the second device one or more of the plurality of the pieces of the related information associated with the same identification information. In the above aspect, a piece of related information representative of a content of each of the pieces of the plurality of speech voices uttered in sequence is stored in association with the same identification information in the storage device. Accordingly, it is possible to provide a second device with serial pieces of related information corresponding to the plurality of speech voices uttered in sequence.

DESCRIPTION OF REFERENCE SIGNS

10 . . . voice playback apparatus, 11 . . . controller, 12 . . . storage device, 13 . . . communicator, 14 . . . sound receiver, 15 . . . signal processing circuit, 16 . . . sound outputter, 20 . . . voice recognition apparatus, 30 . . . machine translation apparatus, 40 . . . information providing apparatus, 41 . . . controller, 42 . . . storage device, 43 . . . communicator, 50 . . . terminal apparatus, 51 . . . controller, 52 . . . storage device, 53 . . . communicator, 54 . . . sound receiver, 55 . . . display, 56 . . . sound outputter.

What is claimed is:

1. A computer-implemented information providing method comprising:
generating identification (ID) information in response to a user instruction and storing the generated ID information in a first storage device before start of utterance of a time series of a plurality of speech voices sequentially uttered to a microphone;
each time a speech voice, among the time series of the plurality of speech voices, is uttered to the microphone:
generating a piece of related information representing a content of the respective speech voice; and
storing, in a second storage device, the generated piece of related information of the respective speech voice with the stored generated ID information from the first storage device so that the same ID information is associated with each of the generated plurality of pieces of related information corresponding to the plurality of speech voices;
transmitting, in response to a request received from a terminal apparatus that already received the generated ID information, to the terminal apparatus, at least one piece of related information associated with the same ID information; and
deleting the stored generated ID information from the first storage device in response to a user instruction after completing the utterance of the plurality of speech voices.

2. The computer-implemented information providing method according to claim 1, wherein the time series of the plurality of speech voices are sequentially uttered to the microphone during a live performance at a facility, the generated ID information identifying the live performance facility.

3. The computer-implemented information providing method according to claim 1, further comprising:
receiving, from the terminal apparatus that already received the generated ID information, an audio signal representative of a speech voice uttered to the terminal apparatus and the generated ID information;
generating, based on the received audio signal, a piece of related information representative of a content of the speech voice uttered to the terminal apparatus; and
storing, in the second storage device, the generated piece of related information in association the received generated ID information, so that the same ID information, which associated with each of the time series of the plurality of pieces of related information corresponding to the time series of the plurality of speech voices uttered to the microphone, is also associated with the generated piece of related information corresponding to the speech voice uttered to the terminal apparatus.

4. The computer-implemented information providing method according to claim 1, wherein:
the time series of the plurality of speech voices are uttered to the microphone in a first language,
the generating generates the piece of related information in a second language differing from the first language, and
the storing stores the generated piece of related information in the second language in the second storage device, so that the same ID information is associated with each of the time series of the plurality of pieces of the related information in the second language corresponding to the plurality of the speech voices uttered in the first language.

5. A communication system comprising:
one or memories storing instructions; and
one or more processors connected to the one or memories that execute the instructions to:
generate identification (ID) information in response to a user instruction and store the generated ID information in a first storage device before start of utterance of a time series of a plurality of speech voices sequentially uttered to a microphone;
each time a speech voice, among the time series of the plurality of speech voices, is uttered to the microphone:
generate a piece of related information representing a content of the respective speech voice; and
store, in a second storage device, the generated piece of related information of the respective speech voice with the stored generated ID information from the first storage device so that the same ID information is associated with each of the generated plurality of pieces of related information corresponding to the plurality of speech voices;
transmit, in response to a request received from a terminal apparatus that already received the generated ID information, to the terminal apparatus, at least one piece of related information associated with the same ID information; and
delete the stored generated ID information from the first storage device in response to a user instruction after completing the utterance of the plurality of speech voices.

6. A non-transitory computer-readable medium storing a program executable by a computer to execute a method comprising:
generating identification (ID) information in response to a user instruction and storing the generated ID information in a first storage device before start of utterance of a time series of a plurality of speech voices sequentially uttered to a microphone;
each time a speech voice, among the time series of the plurality of speech voices, is uttered to the microphone:
generating a piece of related information representing a content of the respective speech voice; and
storing, in a second storage device, the generated piece of related information of the respective speech voice with the stored generated ID information from the first storage device so that the same ID information is associated with each of the generated plurality of pieces of related information corresponding to the plurality of speech voices;
transmitting, in response to a request received from a terminal apparatus that already received the generated ID information, to the terminal apparatus, at least one piece of related information associated with the same ID information; and
deleting the stored generated ID information from the first storage device in response to a user instruction after completing the utterance of the plurality of speech voices.

* * * * *